(12) United States Patent
Hart (10) Patent No.: US 7,162,949 B1
(45) Date of Patent: Jan. 16, 2007

(54) HOT WATER DISPENSING ATTACHMENT

(75) Inventor: Burton L. Hart, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 6 days.

(21) Appl. No.: 10/683,968

(22) Filed: Oct. 9, 2003

Related U.S. Application Data (60) Provisional application No. 60/417,287, filed on Oct. 9, 2002.

(51) Int. Cl.
*A47J 31/00* (2006.01)

(52) U.S. Cl. .................... 99/284; 99/290; 222/146.5

(58) Field of Classification Search .................. 99/284, 99/290; 222/639, 640, 383, 146.2, 146.5
See application file for complete search history.

(56) References Cited

U.S. PATENT DOCUMENTS

| | | | | |
|---|---|---|---|---|
| 4,055,279 A | * | 10/1977 | Lapera et al. ............... 222/54 |
| 4,757,753 A | * | 7/1988 | Pandolfi ...................... 99/290 |
| 4,892,031 A | * | 1/1990 | Webster et al. ............... 99/284 |
| D328,995 S | | 9/1992 | Verheijen ..................... D7/309 |
| D332,027 S | | 12/1992 | Verheijen ..................... D7/308 |
| 5,211,103 A | * | 5/1993 | Anson ......................... 99/284 |
| 5,285,718 A | * | 2/1994 | Webster et al. ............... 99/290 |
| 6,053,092 A | * | 4/2000 | Anderson .................... 99/275 |
| 6,098,524 A | * | 8/2000 | Reese .......................... 99/280 |

* cited by examiner

*Primary Examiner*—Reginald L. Alexander
(74) *Attorney, Agent, or Firm*—Barnes & Thornburg LLP

(57) ABSTRACT

Disclosed is a method, system, apparatus and kit for dispensing hot water. The apparatus includes a body which may be positioned or etched to a portion of a housing of a brewer or other beverage making system. The body may be mounted in various orientations relative to the brewer. A moveably mounted faucet is provided on the body to accommodate one of several orientations.

21 Claims, 5 Drawing Sheets

HOT WATER DISPENSING ATTACHMENT

This application claims the benefit of U.S. Provisional Application No. 60/417,287 filed Oct. 9, 2002.

BACKGROUND

The present disclosure relates to a method, system, apparatus and kit for dispensing hot water from a beverage making system or brewer.

There are numerous beverage making systems that may benefit from the present disclosure, for example, coffee brewers, tea brewers, beverage concentrate dispensers or any other beverage dispenser that produces hot beverages.

Beverage making systems, such as those mentioned above, require a source of hot water. For example, a hot water tank may provide the source of the hot water needed for producing beverages. The term "hot water tank" is broadly used in the present disclosure as referring to a container in which a quantity of water may be heated and retained at a desired temperature for dispensing as water or dispensing as water during a brewing process. This includes hot water tanks as well as hot water reservoirs or any other portion or component of a beverage or food making system in which water is heated for subsequent use. Beverage dispensers with hot water tanks receive water from a pressurized line or a basin, which provides water at either at cool or ambient temperature. The hot water tank then heats water introduced into its interior by means of a heating element which is typically located within or proximate to the hot water tank.

The hot water flows from an opening in the hot water tank through tubing or a pipe and through a spray head into a funnel containing a beverage making substance such as tea or coffee grounds. Water may be dispensed from a hot water tank as a result of gravity filling the tank by pouring water into a basin which communicates with the tank, such a gravity feed system is known in the art. Alternatively, hot water may be dispensed from a hot water tank using a control system in which a control valve coupled to the water line exiting the hot water tank can be controlled by a controller during a brewing process.

In addition to producing beverages such as coffee or tea, many beverage making systems also dispense hot water from a hot water delivery system through a hot water faucet. While the separate dispensing of hot water may not be a primary function of the beverage producing system, the availability of hot water is desirable for many reasons. For example, hot water may be dispensed from the beverage making system directly into a cup holding a tea bag or the cup may hold an instant beverage powder such as instant hot chocolate or instant soup. Additionally, hot water dispensed from the beverage server may be dispensed into a larger container for other food preparation activities or for cleaning or other sanitation purposes.

In order to provide a hot water delivery system, some beverage producing systems are manufactured with a hot water faucet protruding from a surface of the beverage maker. These hot water faucets may be located in a variety of locations on the beverage makers. For example, hot water faucets may be located on an overhanging portion of the beverage maker above where a funnel is located during the brewing process. Other locations for a hot water faucet may include side surfaces or the lower base of a beverage maker.

In any of these locations, the hot water faucets generally are installed at the factory during the manufacturing process. The hot water faucets are not user configurable after the beverage makers leave the factory. Additionally, none of the typical faucet locations discussed above provide a hot water faucet at a location with a similar height relative to a container from which a beverage is dispensed. As such, the hot water valve may be located either well above or well below a convenient height for dispensing hot water into a container.

The present disclosure addresses the issues discussed above by providing a modular hot water dispenser which may be positioned by a user. Further the modular hot water dispenser can be configured to provide a hot water faucet at a more desirable height. The modular hot water dispenser generally has a narrow footprint so as to minimize valuable counter space in a beverage serving environment.

The present disclosure relates to a method, system, apparatus and kit for dispensing hot water from a beverage making system or brewer. The present disclosure includes a body which may be positioned or attached to a portion of a housing or structure of a brewer or other beverage making system. The body may be mounted in a left or right side orientation relative to the brewer. A moveably or rotatably mounted faucet is provided on the body which provides a serving outlet for hot water. Because of the moveable or rotational feature, the body may be easily converted from a left side orientation to a right side orientation. Additionally, fastening points and a cover plate are provided for attaching the body to the brewer and concealing a tube within the body.

The present disclosure further includes a tube for placing the faucet in communication with a hot water supply line from the brewer through an aperture in a side surface of the brewer. The tube may run through an interior of the body and provides hot water to the faucet.

Additional features will become apparent to those skilled in the art upon consideration of the following detailed description of drawings illustrating at least one embodiment of the disclosure. Additional features will become apparent to those skilled in the art upon consideration of the following detailed description of the drawings.

BRIEF DESCRIPTION OF THE DRAWINGS

The detailed description particularly refers to the accompanying figures in which.

DETAILED DESCRIPTION

While the present disclosure may be susceptible to embodiment in different forms, there is shown in the drawings, and herein will be described in detail, at least one embodiment with the understanding that the present description is to be considered an exemplification of the principles of the disclosure and is not intended to limit the disclosure to the details of construction and the arrangements of components set forth in the following description or illustrated in the drawings.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Figure 1:
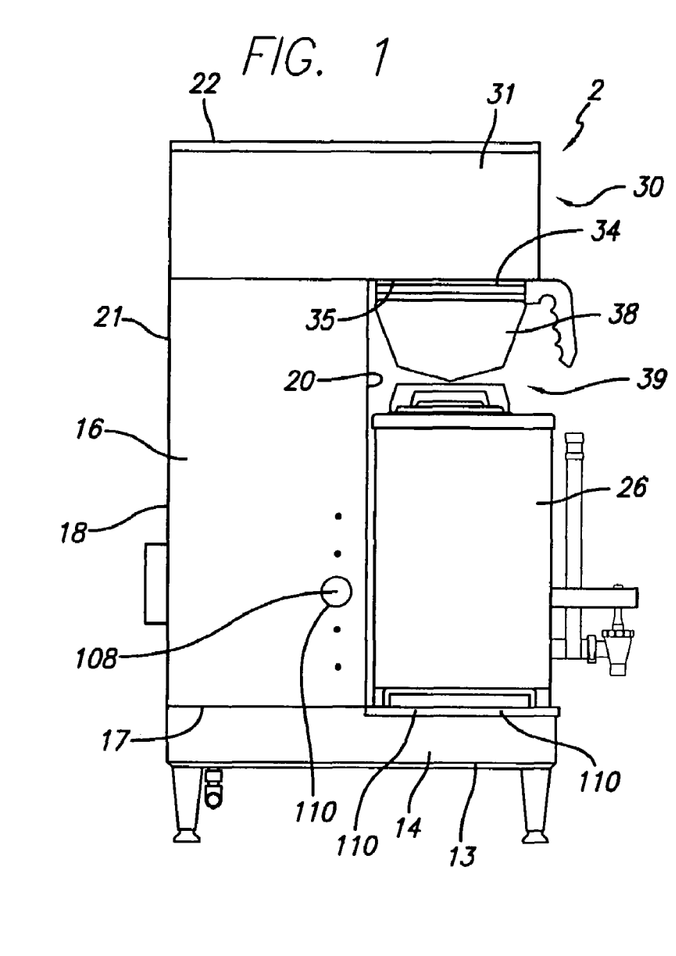
FIG. 1 is a diagrammatic side elevational view of a beverage maker.
Figure 2:
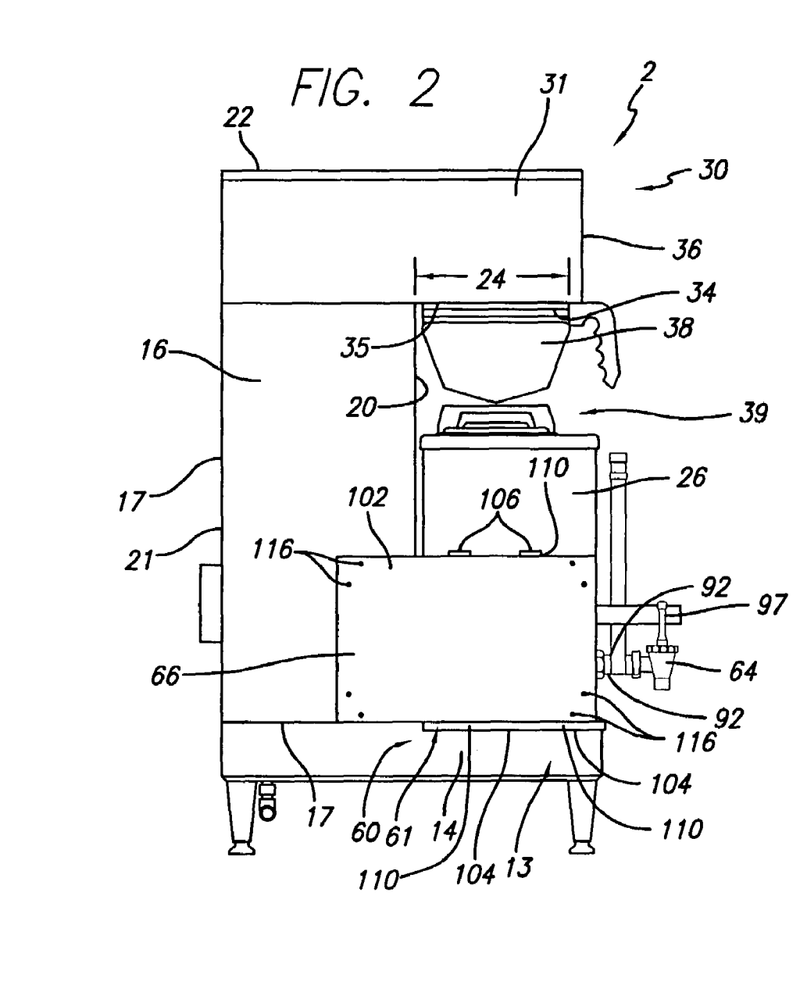
FIG. 2 is a side elevational view of the beverage maker of FIG. 1 with the apparatus of the present disclosure mounted in a left side orientation.

With reference to the figures, FIG. 1 shows a beverage dispenser, brewer or beverage maker 2. While a coffee brewer is shown, it is anticipated that other beverage dispensers or makers 2 may be used in conjunction with the present disclosure. For example, a tea brewer, hot water dispenser, or any other device having a source or supply of hot water may benefit from the present disclosure.

The brewer 2 is generally comprised of a base 13, a pair of side walls 16, a front wall 20, a rear wall 21, a top 22, and an overhang portion 30. The base 13 is a generally rectangular planar horizontal structure having a pair of short sides 14 and a pair of long sides 15. While a generally rectangular structure is disclosed, a variety of other geometric shapes may be employed which serve the same function without departing form the scope of the present disclosure.

Each side wall 16 is of also generally rectangular in shape having a pair of short sides 17 and a pair of long sides 18. The short sides 17 of side walls 16 are roughly half the length as the short sides 14 of base 13. One of the short sides 17 of each side wall 16 is welded or otherwise fastened to a corresponding short side 14 of the base 13. The side walls 16 are fastened to the base 13 to form roughly a right angle relative to base 13, thereby placing the side walls 16 in generally vertical alignment. The side walls 16 are fastened to the base 13 proximate to the intersection of short side 14 and long side 15. While the fastening means disclosed in one embodiment is welding, other fastening means such as machine screws, rivets or other suitable fastening means or manufacturing techniques known to those of skill in the art may be employed.

Rear wall 21 is dimensioned to be generally the same height as the long side of side walls 16 and generally the same width as the long side 15 of base 13. One of the sides of the rear wall 21 having generally the same width dimension as the long side 15 of base 13 is fastened to one of the long sides 15 of base 13. Rear wall 21 is fastened to the base 13 in a vertical orientation forming a generally right angle. The rear wall 21 also engages one of the long sides 18 of both side walls 16 at roughly right angles and is fastened thereto.

The front wall 20 is also generally the same height as the long sides 18 of side walls 16 and generally the same width of the long side 15 of base 13. A surface of the front wall 20 having generally the same width as the long side 15 of the base 13 is attached at generally a mid point between the two long side 15 of base 13. The front wall 20 also engages one of the long sides 18 of both side walls 16 at generally right angles The side walls 16, rear wall 21 and front wall 20 all terminate at generally the same height above the base 13 forming a generally planner surface.

Overhang 30 is dimensioned to contain two long sides 32 and two short sides 31. The sides 31, 32 are generally twice as tall as sides 14, 15 of base 13. Overhang 30 is fastened to the uppermost surfaces of side walls 16, rear wall 21 and front wall 20 where they terminate. A top 22 is provided on overhang 30 and is fastened to the side opposite the side which attaches to the terminal portions of side walls 16, rear wall 21 and front wall 20. The overhang 30 is fastened to rear wall 21 and side walls 16 so as to continue vertical planes formed by rear wall 21 and side walls 16 until the planes terminate at top 22. The front wall 20 however is interrupted by overhang 30 which extends horizontally beyond a vertical plane established by front wall 20 roughly the distance of the side 14 of base 13 thus forming a cantilevered portion or area 24.

The cantilevered portion 24 has a front portion 36 and an underside portion 35. The front portion 36 rises vertically from the underside portion 35 to engage the top 22. The underside portion 35 may have retaining means shown as funnel rails 34 for removably retaining funnels 38. While one embodiment discloses funnels 38, the present disclosure may be utilized with or without funnels 38.

A beverage dispensing area 39 is defined by the area below the cantilevered portion 24. The beverage dispensing area 39 may receive beverage servers 26. In one embodiment one beverage server 26 is placed under each funnel 38 for receiving beverage. The beverage servers 26 may take the form of any container capable of holding a beverage. While beverage servers 26 are discussed, the present disclosure may be practiced without beverage servers 26, such as by dispensing directly into self-contained reservoirs or individual serving containers, and not depart from the scope or spirit of the present disclosure.

FIGS. 2–6 show a hot water dispensing apparatus or hot water dispenser 60 attached to a brewer 2. The hot water dispenser 60 is a hot water dispensing attachment which can be removably attached to selected surfaces of a beverage dispenser 2. As illustrated, the hot water dispenser 60 is a generally rectangular box-like structure. The hot water dispenser 60 has a housing 61 including a body 62, and a cover 66. The body 62 is formed by four walls 68 and a side wall 70. One of the walls 68 is dimensioned to contain a faucet aperture 92 and is designated as the faucet wall 93. The two walls 68 abutting the faucet wall 93 each contain mounting apertures 100 and are designated as mounting walls 102.

In one embodiment, each of the walls 68 may have generally equal dimensions. However alternative embodiments which have walls 68 of non-uniform dimensions may be possible without departing from the scope of the present disclosure. Also, it should be understood that many different housing 61 configuration with many different shapes may be used to achieve the structure and function of the disclosed device.

Figure 3:
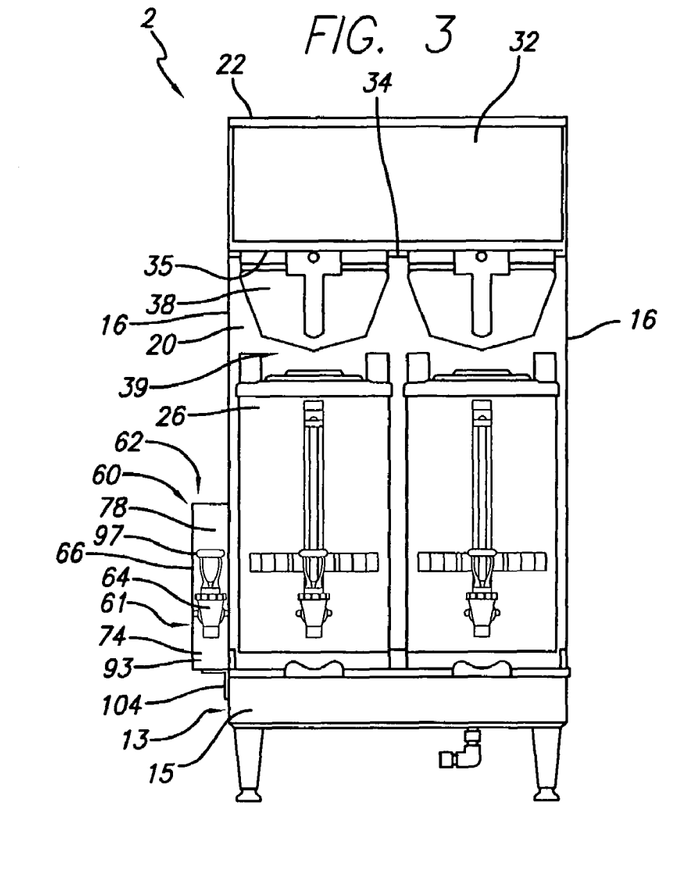
FIG. 3 is a front elevational view of the beverage maker of FIG. 1 with the apparatus of the present disclosure mounted in a left side orientation as shown in FIG. 2.
Figure 4:
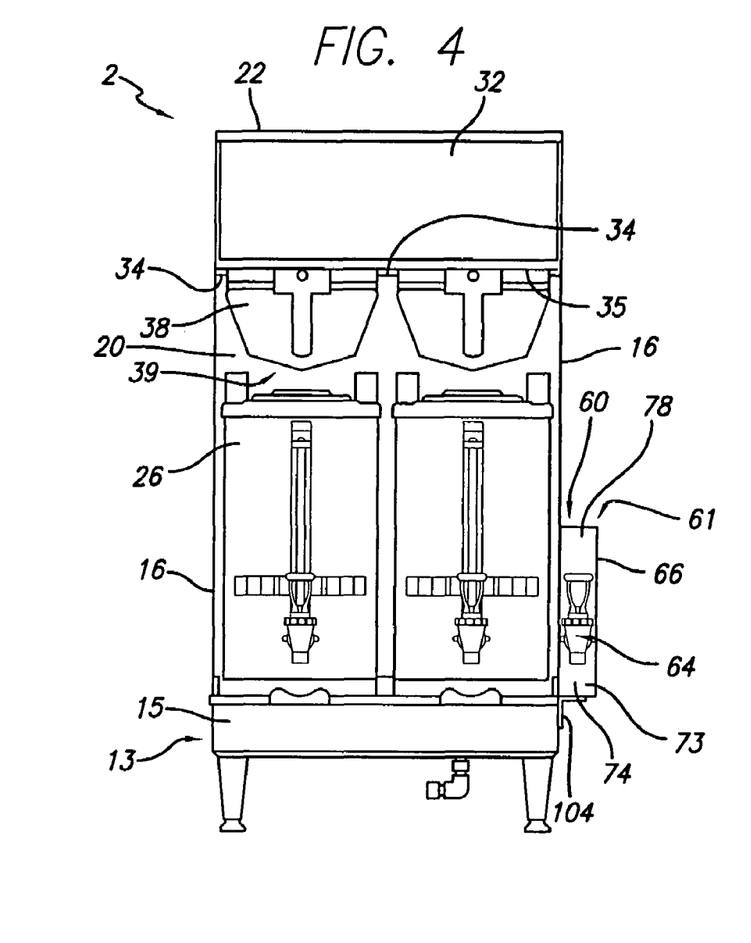
FIG. 4 is a front elevational view of the beverage maker of FIG. 1 with the apparatus of the present disclosure mounted in a right side orientation.
Figure 6:
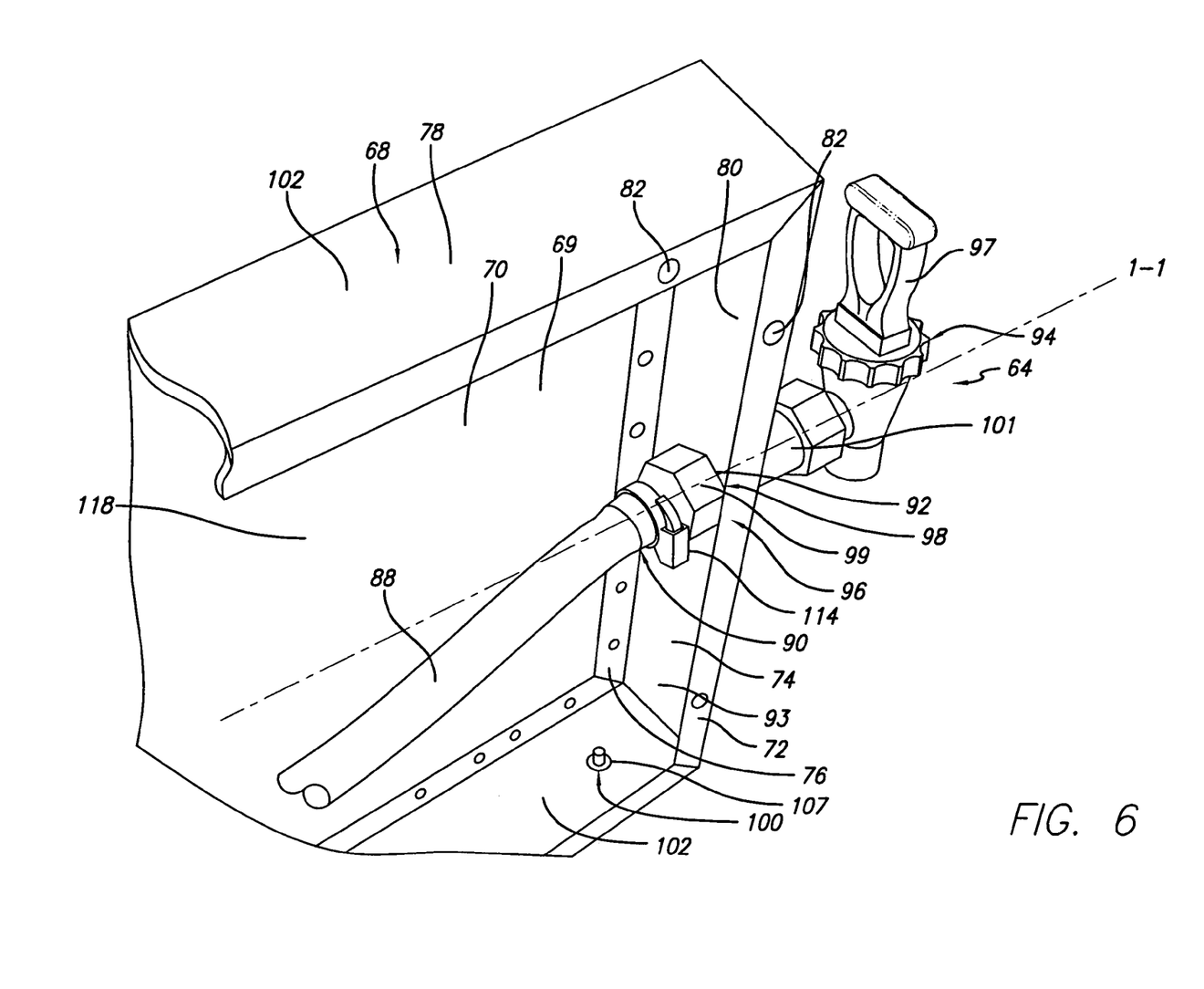
FIG. 6 is an enlarged partial fragmentary perspective view of a front portion of the apparatus of the present disclosure.

As seen in FIGS. 3 and 6, each wall 68 has a first planar surface or outer flange 72, a second planar surface or side surface 74 and a third planar surface or inner flange 76. The second planar surface 74 defines a width dimension or footprint of the hot water dispenser 60 relative to the brewer 2. Each second planar surface 74 has an outer surface 78 and an inner surface 80. Both the first planar surface 72 and third planar surface 76 are attached to the inner surface 80 of the second planar surface 74 at generally right angles such that the first planar surface 72 and the third planar surface 76 are parallel to each other.

Each of the outer flanges 72 is provided with fasteners or attaching structures for attaching the cover 66. In one embodiment, each of the first planar surfaces is dimensioned to contain two apertures 82 which function as attachment structures. The apertures 82 may contain a threaded portion for engaging a machine screw 116, bolt or other fastener known to those of skill in the art. While two apertures are disclosed, any number of apertures are contemplated.

The inner surface 74 of each of the four walls 68 is attached to and terminates at another inner surface 74 of another wall 68 at a generally right angle, thus forming a generally planar rectangular structure. The side wall 70 is dimensioned such that a perimeter of the side wall 70 has dimensions generally equal to the perimeter of the rectangular structure formed by the walls 68. The side wall 70 has an inner surface 69 and an outer surface 71. The side wall 70 is fastened about its perimeter to the third planar surface 76 of the walls 68, with the inner surface 69 engaging the third planar surface 76 of the walls 68. Any means for fastening, suitable for such purposes such as rivets, welding, or machine screws may be employed. Other fastening means known to those of skill in the art may be employed.

While a unitary structure for each of the four short walls 68 is disclosed, it is contemplated that the short walls 68 which form the rectangular structure onto which the side wall 70 is attached may be formed of separate components. As a unitary structure, a unitary section of material may be bent or otherwise machined to include right angles at intervals which would form the rectangular structure. Additionally, each of the first planar surfaces 72, second planar surfaces 74 and third planar surfaces 76 may be formed in a like manner. In an embodiment where separate components are employed, each component may be welded or otherwise attached to one another to form the structure discussed above. It should be noted that the housing may be formed of a unitary piece of material such as plastic or other suitable structure to provide the same or equivalent structures and functions as described above. Disclosure of the specific embodiment as shown in the illustrations and described above should not limit the structure of the housing 61 but, rather, the definition of the housing 61 should be broadly interpreted.

Figure 5:
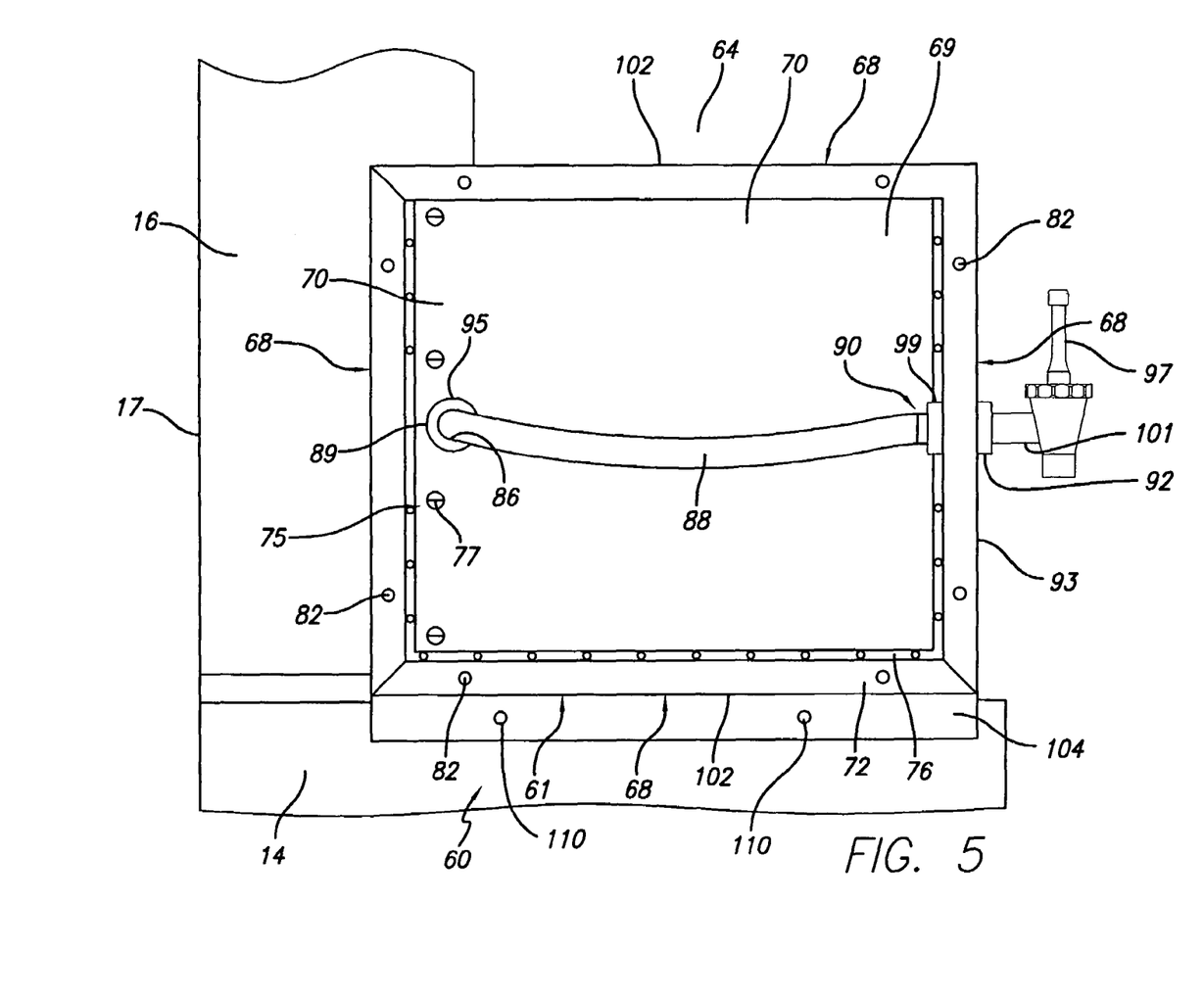
FIG. 5 is an enlarged partial fragmentary side elevation view of the apparatus of the present disclosure mounted in a left side orientation as shown in FIG. 2 with a cover removed.

The housing 61 is attached to a side wall 16 of the brewer 2 using attachment devices 75 which, as shown for example in FIG. 5, include fasteners 77 extending through the side wall 70 and the side wall 16 of the brewer 2. While mounting apertures and mounting screws are disclosed, any mounting means including fasteners, formed structures, adhesives, magnets, clamps, or other devices or equivalents may be employed without departing from the present disclosure.

A hose aperture 86 is included to provide a void, through which a water delivery line, shown here as supply tube 88, may be inserted. The tube is one example of one form of means for receiving hot water from the beverage dispenser. A first end 89 of the supply tube 88 may be in communication with a hot water source within the brewer 2 for delivering hot water to the hot water dispenser 60. A second end 90 of the supply tube 88 may be in communication with a faucet assembly 64 through which hot water may be delivered to a beverage container. The faucet assembly is one example of one form of means for controllably dispensing hot water from the beverage dispenser. For example, the first end 89 of supply tube 88 is attached to a suitable coupling installed in a side wall with a hot water tank of known construction. One of skill in the art will appreciate that the coupling installed into the side wall of the tank will be similar to that as shown in FIG. 6 in which the second end 90 is connected to the faucet assembly 64. The tube 88 is of a suitable length to provide connection at the first end 89 and the second end 90. It should be noted, that a grommet 95 as provided in the aperture 86 was to prevent damage to the tube 88 extending there through.

The faucet assembly 64 is a structure which includes a user controllable valve, having a control handle 97, through which hot water may flow. The faucet assembly 64 is selectively rotatably, moveably or otherwise adjustably carried on or mounted on the second surface 74 of the faucet wall 93. The faucet assembly 64 may be any suitable faucet known to those of skill in the art. With reference to the faucet assembly is to be broadly defined and interpreted such that a mechanical faucet as shown in the drawings as well as an electromechanical or any other form of faucet. If an electromechanical faucet is substituted, it is envisioned that a control unit of the electromechanical faucet can be positioned within the housing making the entire faucet assembly 64 part of a kit to be described in greater detail herein below. As such, the term faucet assembly should be broadly defined and interpreted. In one embodiment, a user accessible portion 94 protrudes from the outer surface 78 of second surface 74 (see FIG. 3). The user accessible portion 94 may be manipulated by a user to start and stop a flow of hot water from the hot water dispenser 60. A mounting portion 96 of the faucet assembly 64 extends through faucet aperture 92 and into an interior cavity 118 of hot water dispenser 60. The mounting portion 96 includes a structure for rotatably mounting 98 the faucet assembly 64 to the faucet wall 93 of the hot water dispenser 60.

In one embodiment, the means for rotatably mounting 98 the faucet assembly 64 is a hex head nut 99 which engages a threaded portion of a tubular neck 99 the mounting portion 96. When the faucet is properly positioned, the hex head nut 99 is tightened to engage the inner surface 80 while a portion of the user accessible portion 94 engages the outer surface 80 thereby forming a friction engagement with the second planar surface 74 of the faucet wall 93. While a nut and thread arrangement is discussed, any suitable means for rotatably or otherwise adjustably mounting the faucet assembly 64 to the hot water dispenser 60 known to those of skill in the art may be employed without departing from the scope of the present disclosure.

In order to attach the hot water dispenser 60 to the brewer 2, a user must first decide whether the hot water dispenser 60 is to be mounted on the brewer 2 in a left side or right side configuration. The hot water dispenser 60 is manufactured for mounting to either side of the brewer 2. The hot water dispenser 60 may be conveniently manufactured and preconfigured for mounting on the side of the machine which most users mount the dispenser 60. Regardless of the orientation in which the hot water dispenser 60 is manufactured, a user may need to mount the dispenser on an opposite side of the brewer. In such a case, the hot water dispenser 60 of the present disclosure may be reconfigured easily by the user. It should be noted that while reference to "left side" or "right side" orientation of the water dispenser is discussed, it is envisioned that the dispenser 60 could also be positioned on the top portion (22) of the brewer 2 as well as underneath the base 13. These alternate locations (top and bottom) may be accommodated by the dispenser 60. The top and bottom locations provide other places to which the housing 61 can be attached to provide a user configurable or hot water dispenser in a desired location. However, for purposes of this disclosure the reference is made to the left hand side and the right hand side for ease of description.

To adapt the hot water dispenser 60 for an opposite side orientation, a user first relocates a mounting bracket 104 from one of the mounting walls 102 to the other mounting wall 102. This may be accomplished by removing mounting aperture covers 106, such as screws or caps, (see FIG. 1) from mounting apertures 100 on the mounting wall 102 which will become the wall 68 defining the lowest portion of the hot water dispenser 60. The mounting bracket 104 is then removed from the mounting wall 102 onto which it was mounted at a factory by disengaging fasteners 107 (see FIG. 6). The mounting bracket 104 and fasteners 107 are then transferred to the opposite mounting wall 102 where the mounting bracket 104 is reattached through the use of fasteners 107. The aperture covers 106 are then inserted into the empty mounting apertures 100 where the mounting bracket 104 was originally attached.

While a mounting bracket 104 is discussed above, the present disclosure may be practiced without the mounting bracket 104 without departing from the spirit of the present disclosure. For example, the hot water dispenser 60 may be attached to the brewer 2 by means of screws, bolts, or other fasteners without the need for using a mounting bracket 104. In other words, the housing 61 may be attached to the brewer without the bracket 104. The bracket 104 is used to provide additional support to increase the strength of the connection between the body 62 and the brewer 2.

Next, a user rotates the faucet assembly 64 approximately 180 degrees. This is accomplished by loosening the means for rotatably mounting 98 and manually rotating the faucet assembly 64. After the faucet assembly 64 is in the correct orientation, the means for rotatably mounting 98 is tightened.

Figure 7:
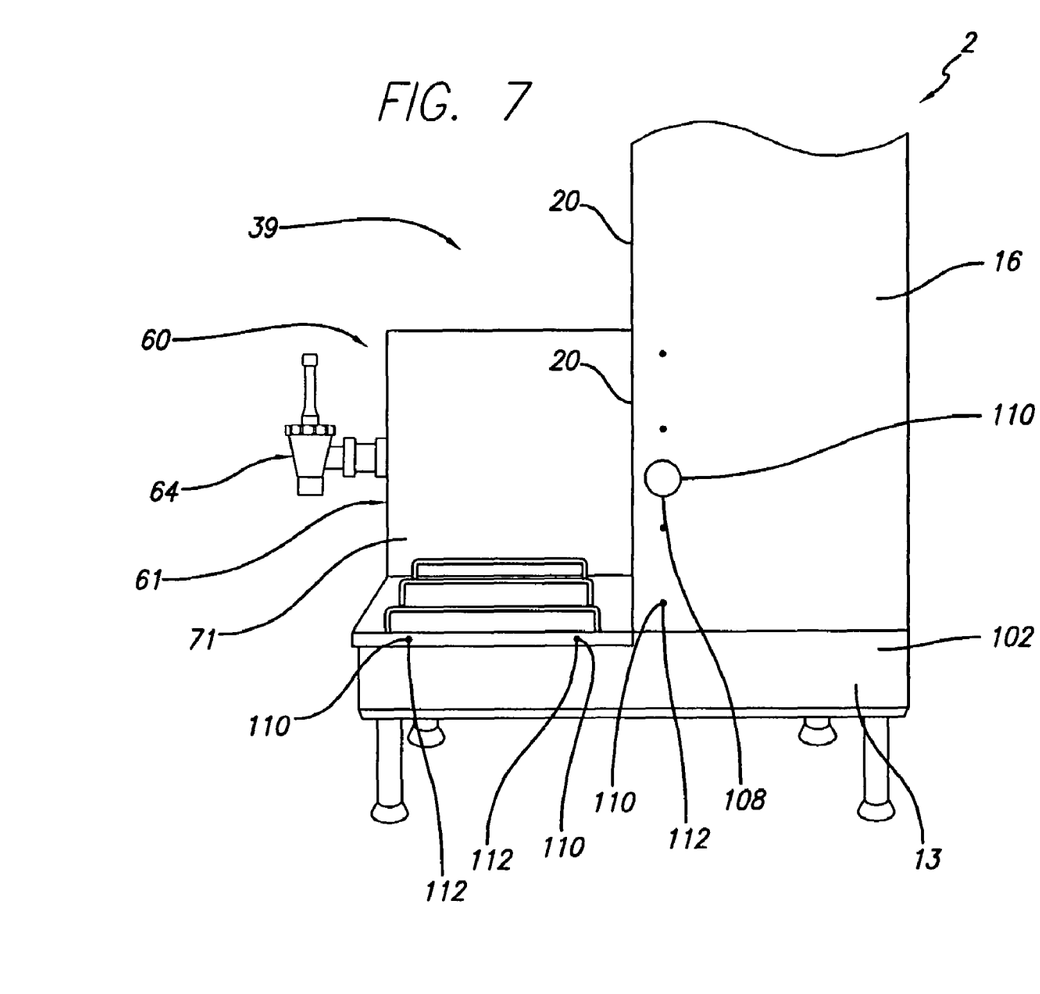
FIG. 7 is a partial fragmentary side elevational view of the beverage maker of FIG. 1 with the apparatus of the present disclosure mounted in a left side orientation, showing the reverse angle of FIG. 2.

The hot water dispenser 60, in its configuration, is now ready for mounting in an opposite orientation on the brewer 2 from which it was manufactured. By simply rotating the hot water dispenser 60 approximately 180 degrees about an axis represented by line 1—1 (in FIG. 6), a user may now use the hot water dispenser 60 in an orientation opposite for which the orientation the hot water dispenser 60 was manufactured. As seen in FIG. 1 and FIG. 7, a brewer hose aperture 108 is provided in the side wall 16 at a predetermined location. Each side wall 16 is provided with a brewer hose aperture 108 having a brewer aperture cover 110 for occluding the brewer hose aperture when no structure is attached to the side wall 16 of brewer 2. Additionally, each side wall 16 and the base 13 are also provided with a plurality of brewer attaching apertures 112 also having brewer aperture covers 110 in the form of fasteners 77.

A user removes the aperture covers 110 from the side wall 16 onto which the hot water dispenser 60 is to be mounted. The front wall 20 is also removed in order to gain access to an interior cavity of the brewer 2 defined by the side walls 16, front wall 20, base 13 and top 22. Such access is provided for connecting the hot water dispenser 60 to the brewer 2 hot water delivery system. A user may then attach the hot water dispenser 60 to the side wall 16 of choice, by means of fasteners which pass though the side wall 70 and into the brewer attaching apertures 112 in side wall 26 and base 13. After the hot water dispenser 60 is attached to the brewer 2, the side wall 70 of hot water dispenser 60 and the selected side wall 16 of the brewer 2 will be adjacent to one another. Further, the hose aperture 86 and brewer hose aperture 108 will also be in alignment.

The supply tube 88 will then be passed through hose aperture 86 and brewer hose aperture 108. In one embodiment, the supply tube 88 may take the form of a food grade silicone tube, however other types of tubes, hoses or flexible piping as well as generally rigid tubing may be employed without departing from the spirit of the present disclosure.

The first end 89 of supply tube 88 is then attached to a water supply line within the interior cavity of the brewer 2 or directly to the hot water source or tank. The second end 90 of the supply tube 88 may be cut to length if there is excessive length. After an appropriate length is established, the second end 90 of supply tube 88 is attached to mounting portion 96 of faucet assembly 64. A hose clamp 114 or other appropriate attaching means may be employed to attach the second end 90 to mounting portion 96.

With the supply tube 88 attached to a water supply of the brewer 2 and the faucet assembly 64, a flow path for hot water is established from a hot water tank within the interior cavity of the brewer 2 to the faucet assembly 64. This flow path will provide a means for communicating hot water from the hot water tank to the faucet assembly 64, which a user may controllably operate to dispense hot water into a beverage container. The flow path will be generally insulated from the environment by the hot water dispenser body 62. The body will provide both protection for the supply tube 88 and reduce thermal loss to the external environment. Additionally, insulating material such as foam or the like may be placed around the supply tube 88 to further reduce thermal loss.

In order to complete the attachment of the hot water dispenser 60 to the brewer 2, a user will attach the cover 66 to the body 62 by means of machine screws 116 or other appropriate fasteners. The machine screws 116 will pass though apertures in cover 66 and into apertures 82 in first planar surfaces 72 having threaded portions.

While brewer attaching apertures 112 and brewer hose aperture 108 are discussed, the present disclosure may be practiced in the absence of such apertures. For example, in the event that the hot water dispenser 60 is to be used on a different line of brewers or water dispensers not possessing the above apertures, other fasteners such as metal screws, pop rivets or any other fastener known to those of skill in the art may be employed. This may occur in a situation where the dispenser 60 is "retro-fitted" to attach to a brewer 2 which was not originally configured to receive the dispenser 60. Additionally, a hole may be drilled or otherwise formed in the side wall 16 of a brewer 2 for passing a supply tube 88 therethrough.

The present disclosure also includes a kit which can be used in the manufacture of retrofitting of the dispenser 60 on appropriate machine. The kit include the housing, appropriate fasteners, valve assembly 64, tube 88 as well a any necessary components for attaching the tube to the hot water supply and the valve. The kit can be prepared as an individual assembly for retrofitting to any type of suitable equipment or may be provided as an inventory kit for use in the manufacturing process. In this regard, the manufacturing process may not call for the assembly of a dispenser 60 of the present disclosure. However, if a change order is requested in the manufacture of a piece of equipment, the dispenser 60 can be readily attached to the corresponding machine.

While an embodiment has been illustrated and described in the drawings and foregoing description, such illustrations and descriptions are considered to be exemplary and not restrictive in character, it being understood that only an illustrative embodiment has been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a parality of advantages of the present disclosure arising from various features set forth in the description. It will be noted that alternative embodiment of the disclosure may not include all of the features described yet still benefit from at least some of the advantages of such features. Those of ordinary skill in the art may readily devise their own implementations of the disclosure and associated methods that incorporate one or more of the feature of the disclosure and fall within the spirit and scope of the present disclosure as defined by the impendent claims.

The invention claimed is:

1. A hot water dispensing apparatus for use with a beverage dispenser having a source of heated water, the hot water dispensing apparatus comprising:
   a housing having means for receiving hot water from the beverage dispenser, the housing being removably attachable to a first location on the beverage dispenser, the housing being removably attachable to a second location on the beverage dispenser;
   means for controllably dispensing hot water received from the beverage dispenser, the means for controllably dispensing hot water being selectively, adjustably carried on the housing for positioning the means for controllably dispensing hot water in one of various orientations relative to the housing; and
   means for placing the means for receiving hot water and the means for controllably dispensing hot water in communication with one another
   the means for receiving hot water further comprising a tube having one end attachable to the means for controllably dispensing hot water and a second end for attachment to the water source for delivering water from the water source to the means for controllably dispensing hot water.

2. The hot water dispensing apparatus as in claim 1, the means for controllably dispensing hot water further comprising at least one controllable valve attached to the housing, the tube being attached to the valve inside the housing.

3. The hot water dispensing apparatus as in claim 1, further comprising the tube being provided in a length generally longer than necessary so as to allow the tube to be cut to a desired length.

4. The hot water dispensing apparatus as in claim 1, further comprising fasteners for attaching the housing to a beverage dispenser.

5. The hot water dispensing apparatus of claim 1, further comprising means for removably attaching the means for controllably dispensing hot water to the hot water dispensing apparatus.

6. The hot water dispensing apparatus of claim 1, further comprising a means for rotatably attaching the means for controllably dispensing hot water to the hot water dispensing apparatus.

7. A hot water dispensing apparatus for use with a beverage dispenser having a source of heated water, the hot water dispensing apparatus comprising:
   a housing having means for receiving hot water from the beverage dispenser, the housing being removably attachable to a first location on the beverage dispenser, the housing being removably attachable to a second location on the beverage dispenser;
   means for controllably dispensing hot water received from the beverage dispenser, the means for controllably dispensing hot water being selectively, adjustably carried on the housing for positioning the means for controllably dispensing hot water in one of various orientations relative to the housing; and
   means for placing the means for receiving hot water and the means for controllably dispensing hot water in communication with one another
   the housing further comprising a body, an inside wall, and a cover, the cover being removable from the body for attaching the inside wall and body to a beverage dispenser.

8. The hot water dispensing apparatus as in claim 7, further comprising at least one of the body and the inside cover including an aperture therethrough for passing the tube to a beverage dispenser.

9. The hot water dispensing apparatus as in claim 8, further comprising a grommet positionable in the aperture for protecting the tube passing through the aperture.

10. A hot water dispensing apparatus for use with a beverage dispenser having a source of heated water, the hot water dispensing apparatus comprising:
   a housing having means for receiving hot water from the beverage dispenser, the housing being removably attachable to a first location on the beverage dispenser, the housing being removably attachable to a second location on the beverage dispenser;
   means for controllably dispensing hot water received from the beverage dispenser, the means for controllably dispensing hot water being selectively, adjustably carried on the housing for positioning the means for controllably dispensing hot water in one of various orientations relative to the housing; and
   means for placing the means for receiving hot water and the means for controllably dispensing hot water in communication with one another
   further comprising a bracket for attachment to the housing and a portion of a beverage dispenser proximate to the housing.

11. A beverage dispensing system comprising:
   a beverage dispenser having a source of heated water;
   first and second apertures in the beverage dispenser, each of the first and second apertures being located for connection to a hot water dispensing apparatus;
   a hot water dispensing apparatus removably attached to the beverage dispenser;
   a housing of the hot water dispensing apparatus having at least one inlet aperture and at least one outlet aperture, the at least one inlet aperture being adapted for communication with at least one of the first and second apertures in the beverage dispenser and the at least one inlet aperture also being in communication with the at least one outlet aperture;
   at least one valve attached to the outlet aperture; and
   a tube extending from and communicating with the heated water source and the at least one valve, the tube extending through the inlet and outlet apertures and through the housing of the hot water dispensing apparatus.

12. The beverage dispensing system of claim 11, further comprising the at least one valve being movably attached to the housing.

13. The beverage dispensing system of claim 12, further the at least one valve being rotatably retained on the housing for adjustment in one of various configurations.

14. The beverage dispensing system of claim 11, further comprising means for attaching the housing to the beverage dispenser.

15. The beverage dispensing system of claim 11, further comprising a grommet positionable in at least one of the first and second apertures for protecting the tube passing through the aperture.

16. The beverage dispensing system of claim 11, further comprising a bracket for attachment to the housing and a portion of the beverage dispenser proximate to the housing.

17. A beverage dispensing system of claim 11, further comprising the water source being positioned in the beverage dispenser.

18. A method of using a hot water dispensing apparatus with a beverage dispenser having a source of heated water, the method of using the hot water dispensing apparatus comprising the steps of:
providing a removably attachable housing;
providing at least one controllable valve carried on the housing;
providing a water delivery line selectively attachable to the heated water source of the beverage maker and valve to dispense water from the beverage dispenser through the valve;
selectively attaching the housing to the beverage dispenser;
connecting the water delivery line to the heated water source;
extending the water delivery line through the housing;
connecting the water delivery line to the valve;
providing the water delivery line in a length generally longer than necessary;
connecting the water delivery line to at least one of the heated water source and the valve;
cutting the water delivery line to a shorter length to connect it to the other of the heated water source and the valve.

19. A method of using a hot water dispensing apparatus with a beverage dispenser having a source of heated water as in claim 18, the method further comprising the steps of:
providing a hollow grommet;
positioning the grommet in an aperture; and
extending the water delivery line through the grommet.

20. A method of using a hot water dispensing apparatus with a beverage dispenser having a source of heated water as in claim 18, the method further comprising the steps of:
providing a bracket for attachment to the housing and a portion of the beverage dispenser;
attaching the bracket to the beverage dispenser proximate the housing; and
attaching the bracket to the housing.

21. A hot water dispensing apparatus for use with a beverage maker having a source of heated water, the hot water dispensing apparatus comprising:
a housing having a first side removably attachable to a first side of a beverage maker;
the housing having a second second side removably attachable to a second side of a beverage maker;
a cover attachable to one of the first and second sides of the housing for covering an unattached side of the housing;
at least one controllable valve carried on the housing; and
a water delivery line associated with the housing and attachable to a source of heated water provided in a beverage maker and the valve to dispense water from a beverage maker through the valve.

* * * * *